United States Patent
Xu et al.

(10) Patent No.: US 12,173,823 B2
(45) Date of Patent: Dec. 24, 2024

(54) ERROR-PROOF DOUBLE-LOCKING QUICK CONNECTOR

(71) Applicant: CHONGQING SULIAN PLASTICS CO., LTD, Chongqing (CN)

(72) Inventors: Ming Xu, Baicheng (CN); Shulin Cao, Chongqing (CN); Xiongwei Wan, Chongqing (CN); Taiming Shen, Chongqing (CN); Zongjun Han, Chongqing (CN); Yi Yang, Chongqing (CN); Xuyang Li, Yibin (CN); Zijing Xu, Chongqing (CN)

(73) Assignee: CHONGQING SULIAN PLASTICS CO., LTD, Chongqing (CN)

( * ) Notice: Subject to any disclaimer, the term of this patent is extended or adjusted under 35 U.S.C. 154(b) by 0 days.

(21) Appl. No.: 18/104,357

(22) PCT Filed: Nov. 25, 2021

(86) PCT No.: PCT/CN2021/133230
§ 371 (c)(1),
(2) Date: Feb. 1, 2023

(87) PCT Pub. No.: WO2023/279632
PCT Pub. Date: Jan. 12, 2023

(65) Prior Publication Data
US 2024/0271732 A1  Aug. 15, 2024

(30) Foreign Application Priority Data

Jul. 5, 2021 (CN) .......................... 202110760122.0

(51) Int. Cl.
*F16L 37/14* (2006.01)

(52) U.S. Cl.
CPC ......... *F16L 37/144* (2013.01); *F16L 2201/10* (2013.01)

(58) Field of Classification Search
CPC ... F16L 37/0841; F16L 37/12; F16L 37/1225; F16L 37/142; F16L 37/144
See application file for complete search history.

(56) References Cited

U.S. PATENT DOCUMENTS 10,569,644 B2 * 2/2020 Mitsuhashi ............ B60K 15/03
11,199,281 B2 * 12/2021 Gauthier ............. F16L 37/0985
(Continued)

FOREIGN PATENT DOCUMENTS

CN       101644368 A       2/2010
CN       101876387 A      11/2010
(Continued)

*Primary Examiner* — Aaron M Dunwoody
(74) *Attorney, Agent, or Firm* — Jeenam Park

(57) ABSTRACT

An error-proof double-locking quick connector is provided, which includes a male plug provided with a boss and a housing, a cavity structure is provided in the housing, and the cavity structure is provided with a first insertion hole, a second insertion hole, a first limiting hole and a second limiting hole, and a positioning block is also arranged in the cavity structure. A locking device is inserted into the first insertion hole, a positioning card is inserted into the second insertion hole. In the present disclosure, a locker and a positioning card are connected and fixed on the housing, which has a double protection effect on the fixing of the male plug, and is also convenient for observing an installation state, avoiding the occurrence of installation falling off, the structure is simple, and it is easy to disassemble.

9 Claims, 9 Drawing Sheets

(56) References Cited

U.S. PATENT DOCUMENTS

| | | | | |
|---|---|---|---|---|
| 2006/0103134 A1* | 5/2006 | Kerin | ............... | F16L 37/144 |
| | | | | 285/305 |
| 2008/0007053 A1* | 1/2008 | Kerin | ............ | F16L 37/0885 |
| | | | | 285/305 |
| 2010/0032937 A1* | 2/2010 | Kerin | ............... | F16L 37/144 |
| | | | | 285/3 |
| 2010/0052315 A1* | 3/2010 | Kerin | ............ | F16L 37/0885 |
| | | | | 285/148.21 |
| 2010/0276924 A1* | 11/2010 | Gillet | ............ | F16L 37/0885 |
| | | | | 285/93 |
| 2016/0201835 A1* | 7/2016 | Jones | ............... | F16L 37/144 |
| | | | | 285/305 |
| 2019/0271427 A1* | 9/2019 | Zhou | ............... | F16L 37/1225 |
| 2019/0337379 A1* | 11/2019 | Mitsuhashi | ............ | F16B 21/06 |

FOREIGN PATENT DOCUMENTS

| | | | |
|---|---|---|---|
| CN | 105090641 | A | 11/2015 |
| CN | 108571631 | A | 9/2018 |
| CN | 113483179 | A | 10/2021 |
| CN | 215568800 | U | 1/2022 |
| EP | 1526320 | A1 | 4/2005 |

\* cited by examiner

ERROR-PROOF DOUBLE-LOCKING QUICK CONNECTOR

CROSS-REFERENCE TO RELATED APPLICATIONS

The present application is a 35 U.S.C. § 371 National Phase conversion of International (PCT) Patent Application No. PCT/CN2021/133230 filed Nov. 25, 2021, which claims foreign priority of Chinese Patent Application No. 202110760122.0, filed on Jul. 5, 2021 in the State Intellectual Property Office of China, the contents of all of which are hereby incorporated by reference

FIELD OF THE INVENTION

The present application relates to the field of automobile manufacturing, in particular to an error-proof double-locking quick connector.

BACKGROUND OF THE INVENTION

At present, the quick connection devices widely used in automotive fuel and new energy pipeline systems mainly use a single locking mechanism. Generally, the single locking mechanism connection device is unlocked by external force (vibration, flying stones, etc.) during the working process, resulting in a high risk of pipeline system leakage. Improving the single locking mechanism into a double locking mechanism can solve the above problems well. In the case that any one of the above-mentioned locking mechanisms is unlocked and fails, the other locking mechanism can still lock the male joint assembled and connected with it in the connecting device. Although a variety of double locking mechanism connection devices have been applied to automobile pipeline systems, there are still situations where the locking is unstable, especially after one of the locking mechanisms is easy to fall off from the connection device or fails during the unlocking process. The axial displacement of the male joint is relatively large, and there are also defects such as the inability to check whether the male joint is installed in place.

BRIEF SUMMARY OF THE INVENTION

The technical problem to be solved in the present application is to provide an error-proof double-locking quick connector that is convenient for disassembly and assembly, and convenient for checking the installation state of the male plug.

The technical solution of the present application is as follows:

An error-proof double-locking quick connector, including a male plug with a boss and a housing, where a cavity structure is provided in the housing, and one end of the cavity structure is provided with a first insertion hole, the other end of the cavity structure is provided with a second insertion hole, and a first limiting hole and a second limiting hole communicating with each other are symmetrically provided at the middle position of the corresponding cavity structure of the housing, the upper part of the same end hole wall of the two limiting holes is provided with a first inclined wall, a positioning block is also provided in the cavity structure, and two first locking blocks and two second locking blocks are symmetrically arranged on the positioning block, the corresponding positions of the first locking block, the second locking block and the positioning block at the corresponding end form a clamping groove, corresponding positions of the second locking block and the positioning block form an open groove, a locker is inserted into the first insertion hole, the locker includes a pushing plate, and the upper end of the pushing plate is provided with a limiting block, and the lower end is provided with a first clamping strip and a second clamping strip, a second oblique section is provided on each of the two clamping strips, and corresponding positions of the two clamping strips are pre-engaged with the position of the clamping groove; a positioning card is inserted into the second insertion hole, and the positioning card includes a first positioning rod and a second positioning rod, each of the two positioning rods is provided with a first oblique section, after inserting the male plug, the boss moves from top to bottom and squeezes the first oblique section and the second oblique section sequentially, so that the two clamping strips and the two positioning rods are opened one after another, after the boss moves down to the position, the two positioning rods of the positioning card are retracted and the corresponding positions are attached to the outer wall of the male plug, and the corresponding positions on the two clamping strips are slide along the outer curved surface of the male plug, and move the two clamping strips to the position of the open groove for positioning and clamping, at the same time, the boss abuts against the corresponding position of the limiting block to limit the position; when disassembling, first open the two clamping strips and pull out the locker, and then open the two positioning rods to give way to the boss to pull out the male plug.

With the above structure, the locker is inserted into the housing from the position of the first insertion hole, and the clamping strip is pre-connected to the position of the clamping groove of the positioning block. At this time, insert the positioning card from the position of the second insertion hole, the first oblique sections of the two positioning rods on the positioning card and the limiting block form a hole-like structure for the insertion of the male plug, while the two second oblique sections form a ring-like structure; after inserting the male plug, the boss moves from top to bottom and squeezes the first oblique section and the second oblique section sequentially, so that the two clamping strips and the two positioning rods are opened one after another, after the boss moves down to the position, the two positioning rods of the positioning card are retracted and the corresponding positions are attached to the outer wall of the male plug, and the corresponding positions on the two clamping strips are slide along the outer curved surface of the male plug, and move the two clamping strips to the position of the open groove for positioning and clamping, at the same time, the boss abuts against the corresponding position of the limiting block to limit the position. If the male plug is not installed in place, one case is that when the two positioning rods are in the open state compared with the initial position in the two limiting holes, the positioning card is loose, and the other case is that the boss of the male plug has passed the position of the positioning rod, but the clamping strip and the positioning block have not moved from the pre-clamping position to the clamping positioning position, from the outside of the housing, you can see that the two clamping strips of the locker are opened outward, that is, the locker is loose, and the positions of the two limiting holes are convenient for checking the installation status; when disassembling, first pull out the two clamping strips from the positioning block and pull out the locker, and at the same time move the clamping strips to the pre-clamping position with the positioning block to prevent the locker from slipping, and then open the two positioning rods to give way to the boss to pull out the male plug, the structure is simple and compact, and the whole disassembly process is simple and fast.

In order to better limit the male plug, adapt to the shape of the positioning card and avoid interference, as a preference, an arc groove matching the outer diameter of the male plug is provided on one side of the limiting block, and a relief groove is respectively provided on the left and right sides of the notch of the arc groove, and a horizontally protruding protrusion is provided on the outer side of each of the relief grooves, each of the protrusions is provided with a relief oblique section; a fixing block is provided at a lower end of the limiting block, and the fixing block and the limiting block forms a stepped structure with a wide top and a narrow bottom, a limiting groove concentric with the arc groove is provided on the fixing block, and a weight-reducing hole is provided on a lower end surface of the fixing block.

In order to facilitate adaptation to the corresponding structure of the housing and simplify the structure, as a preference, the first clamping strip and the second clamping strip protruding horizontally are provided on the limiting block, the extension lines of the protruding ends of the two clamping strips intersect on the horizontal plane; a first contact block and a first positioning block are sequentially provided on the inner side wall of the first clamping strip along the extending direction, the outer wall of the first clamping strip is provided with a first anti-off block, the inner wall of the first contact block is provided with a first groove, the upper end of the first contact block is provided with a second oblique section; a second contact block and a second positioning block are sequentially provided on the inner side wall of the second clamping strip along the extending direction, and the outer side wall of the second clamping strip is provided with a second anti-off block, the inner side wall of the second contact block is provided with a second groove, and the upper end of the second contact block is also provided with a second oblique section, the locker extends into the first insertion hole, and when the first clamping strip and the second clamping strip move to the position of the positioning block, the first positioning block and the second positioning block are inserted into the clamping groove at the corresponding ends for pre-clamping.

In order to facilitate production and ensure the consistency of the disassembly state, as a preference, between the first contact block and the second contact block, between the first groove and the second grooves, between the two second oblique sections and between the first anti-off block and the second anti-off block are arranged symmetrically.

In order to simplify the structure and facilitate production, preferably, the positioning card includes an arc-shaped plate, a first positioning rod and a second positioning rod protruding horizontally are arranged on the upper end of the arc-shaped plate, the extension lines of the protruding ends of the two positioning rods intersect on the horizontal plane, a first positioning boss is provided on the first positioning rod, one side of the protruding end of the first positioning rod is provided with a first oblique section, and the other side is provided with a first extending section protruding obliquely into the first limiting hole, and the first extending section fits with the first inclined wall in the first limiting hole, and a first plug is provided on one side of the first oblique section; a second positioning boss is provided on the second positioning rod, and one side of the protruding end of the second positioning rod is also provided with a first oblique section, and the other side is provided with a second extending section protruding obliquely into the second limiting hole, and the second extending section is connected with the first inclined wall in the second limiting hole, and a second plug is provided on one side of the first oblique section.

In order to facilitate production and ensure the consistency of disassembly and assembly states, preferably, between the first positioning boss and the first positioning boss, between the two first oblique sections, between the first extending section and the second extending section, and between the first plug and the first insertion block are arranged symmetrically.

In order to avoid skidding during assembly and disassembly, preferably, tooth grooves are provided on the outer surface of the pushing plate.

In order to facilitate disassembly, preferably, a notch is provided on the side of the bottom of the cavity structure corresponding to the first insertion hole, and a first disassembly groove is formed between the notch and the pushing plate, and the first disassembly groove communicates with the weight-reducing hole on the locker; and a second disassembly groove is formed between the side of the bottom of the cavity structure corresponding to the second insertion hole and the arc-shaped plate.

In order to make the two positioning rods of the positioning card open quickly when they are disassembled, preferably, guide grooves are provided at the cavity roof of the cavity structure corresponding to the first positioning boss and the second positioning boss, and the first positioning boss and the second positioning boss are respectively clamped in the guide grooves at the corresponding ends, and the groove walls on the side of the two guide grooves corresponding to the direction of the first insertion hole are both second inclined walls, and the second inclined wall has the same slope as the first inclined wall.

Beneficial effects: in the present application, a locker and a positioning card are connected and fixed on the housing, which has a double protection effect on the fixing of the male plug, and is also convenient for observing the installation state, avoiding the occurrence of installation falling off, the structure is simple, and it is easy to disassemble.

BRIEF DESCRIPTION OF THE SEVERAL VIEW OF THE DRAWINGS

DETAILED DESCRIPTION OF THE INVENTION

Figure 1:
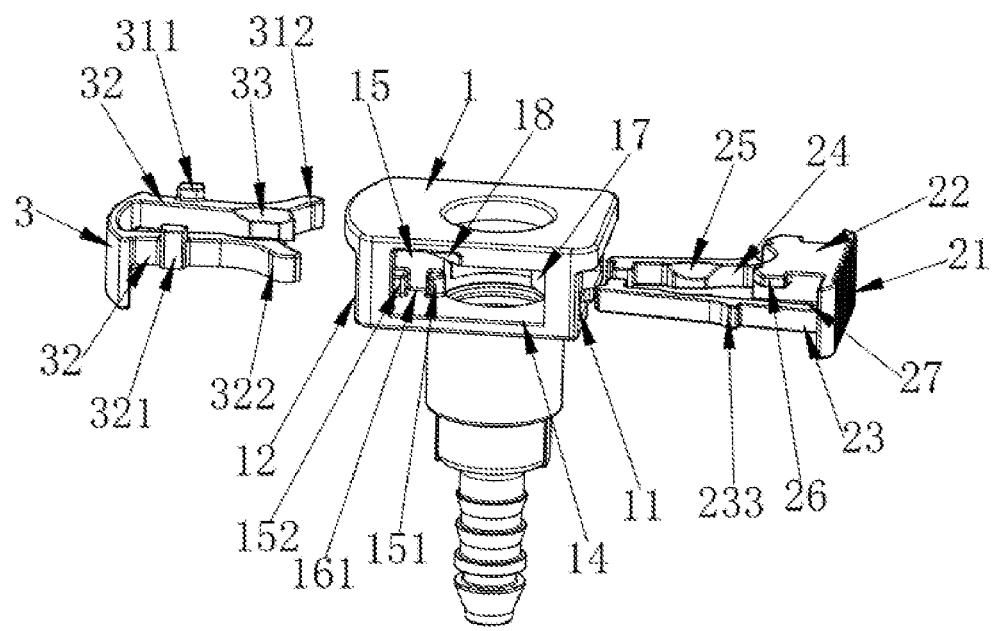
FIG. 1 is an exploded diagram of the installation of the present application.
Figure 2:
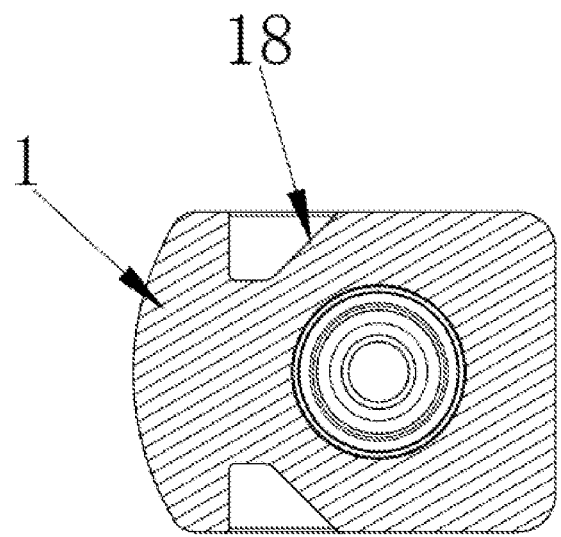
FIG. 2 is a schematic structural diagram of the top of the cavity structure of the housing.
Figure 3:
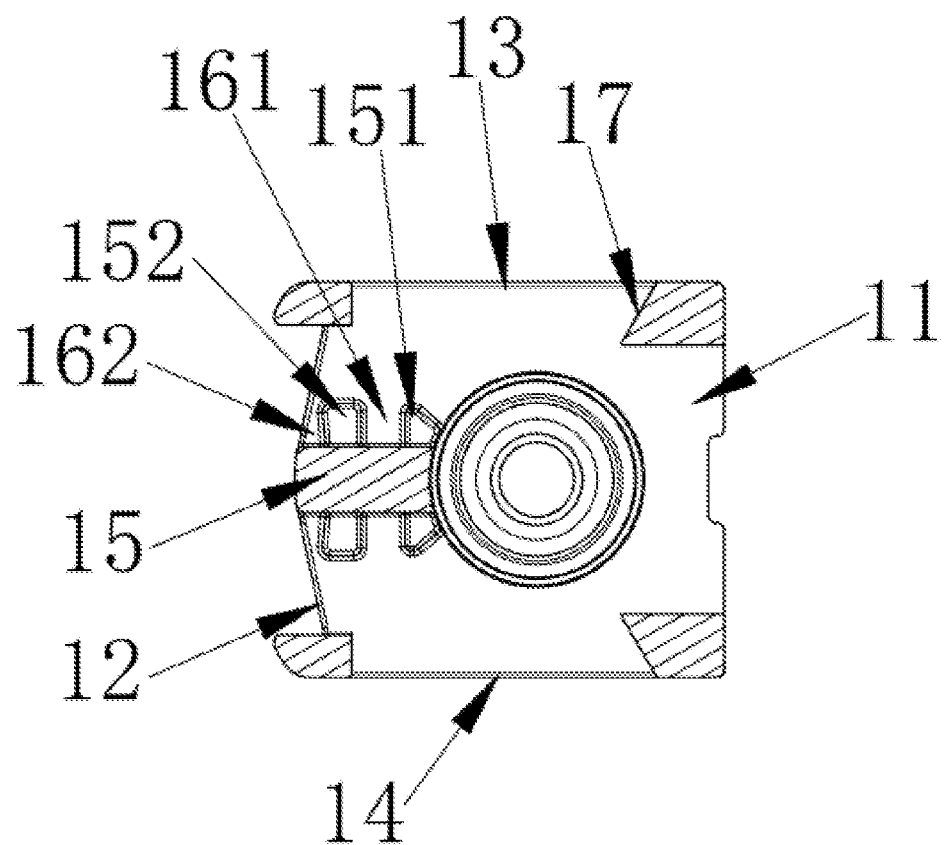
FIG. 3 is a schematic structural diagram of a cavity structure.
Figure 4:
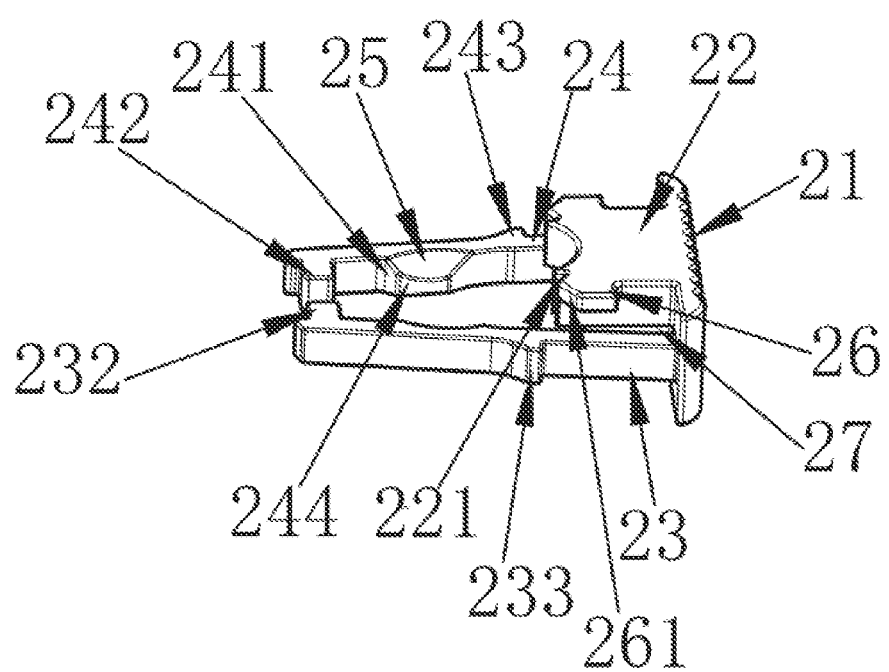
FIG. 4 is a schematic structural diagram of the locker.
Figure 5:
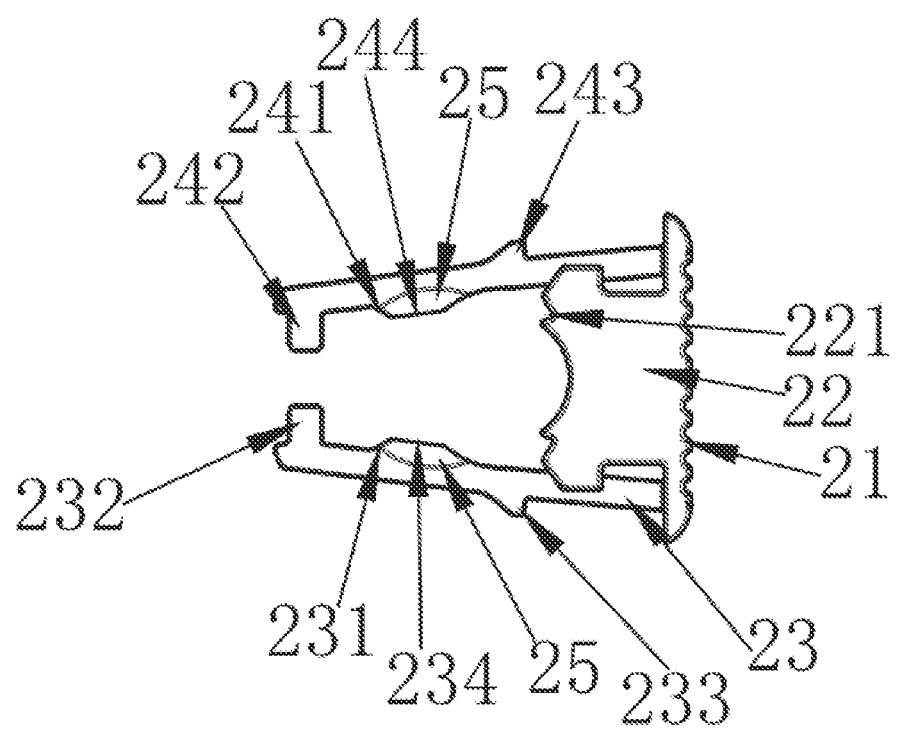
FIG. 5 is a top view of FIG. 4.
Figure 6:
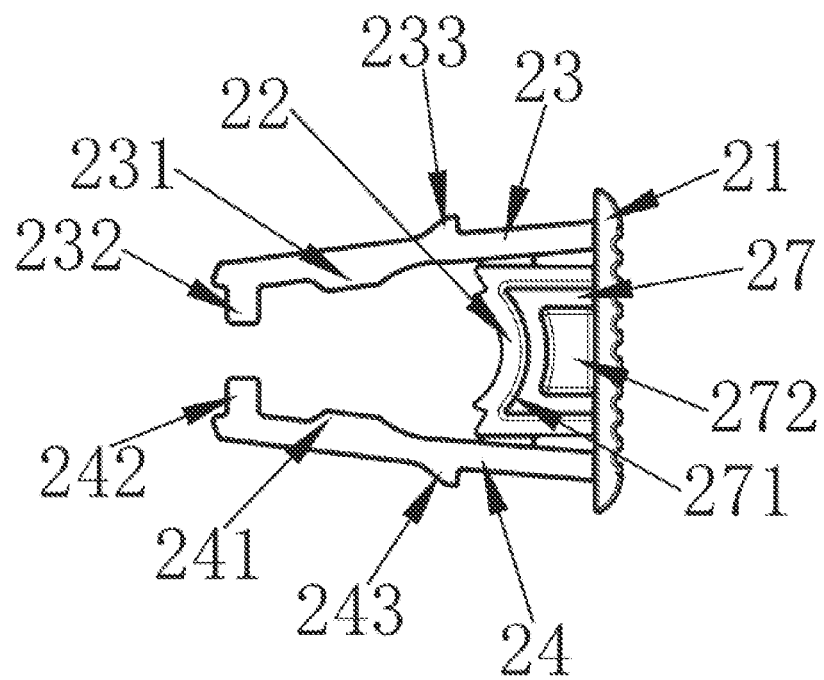
FIG. 6 is a bottom view of FIG. 4.
Figure 7:
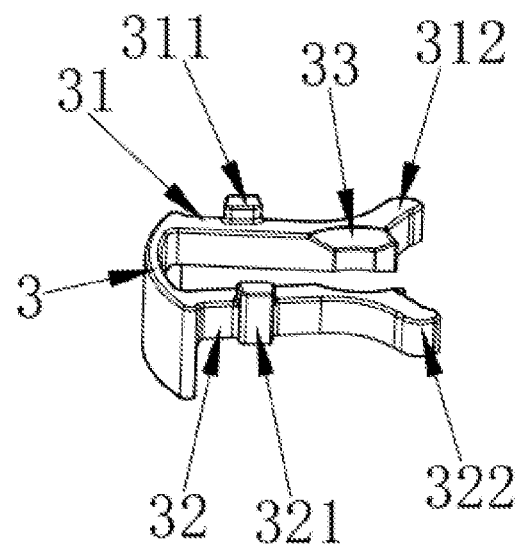
FIG. 7 is a schematic structural diagram of the positioning card.
Figure 8:
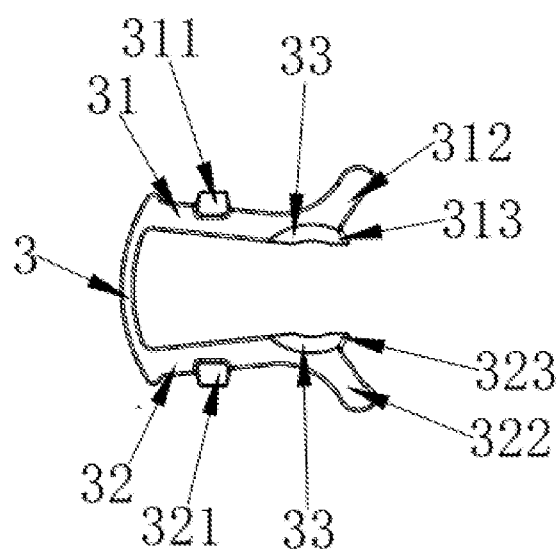
FIG. 8 is a top view of FIG. 7.

The present application will be further described below in conjunction with the accompanying drawings.

As shown in FIG. 1, FIG. 2, FIG. 3, FIG. 4, FIG. 5, FIG. 6, FIG. 7, FIG. 8, FIG. 9, FIG. 10 and FIG. 11, the present application includes a male plug with a boss and a housing 1, where a cavity structure is provided in the housing 1, and one end of the cavity structure is provided with a first insertion hole 11, the other end of the cavity structure is provided with a second insertion hole 12, and a first limiting hole 13 and a second limiting hole 14 communicating with each other are symmetrically provided at the middle position of the corresponding cavity structure of the housing 1, the upper part of the same end hole wall of the two limiting holes is provided with a first inclined wall 17, a positioning block 15 is also provided in the cavity structure, and two first locking blocks 151 and two second locking blocks 152 are symmetrically arranged on the positioning block 15, the corresponding positions of the first locking block 151, the second locking block 152 and the positioning block 15 at the corresponding end form a clamping groove 161, the corresponding positions of the second locking block 152 and the positioning block 15 form an open groove 162.

A locker is inserted into the first insertion hole 11, the locker includes a pushing plate 21, and the upper end of the pushing plate 21 is provided with a limiting block 22, and the lower end is provided with a first clamping strip 23 and a second clamping strip 24, an arc groove matching the outer diameter of the male plug is provided on one side of the limiting block 22, and a relief groove 221 is respectively provided on the left and right sides of the notch of the arc groove, and a horizontally protruding protrusion 26 is provided on the outer side of each of the relief grooves 221, each of the protrusions 26 is provided with a relief oblique section 261; a fixing block 27 is provided at the lower end of the limiting block 22, and the fixing block 27 and the limiting block 22 forms a stepped structure with a wide top and a narrow bottom, a limiting groove 271 concentric with the arc groove is provided on the fixing block 27, and a weight-reducing hole 272 is provided on the lower end surface of the fixing block 27.

the extension lines of the protruding ends of the two clamping strips intersect on the horizontal plane; a first contact block 231 and a first positioning block 232 are sequentially provided on the inner side wall of the first clamping strip 23 along the extending direction, the outer wall of the first clamping strip 23 is provided with a first anti-off block 233, the inner wall of the first contact block 231 is provided with a first groove 234, the upper end of the first contact block 231 is provided with a second oblique section 25, a second contact block 241 and a second positioning block 242 are sequentially provided on the inner side wall of the second clamping strip 24 along the extending direction, and the outer side wall of the second clamping strip 24 is provided with a second anti-off block 243, the inner side wall of the second contact block 241 is provided with a second groove 244, and the upper end of the second contact block 241 is also provided with a second oblique section 25, the locker extends into the first insertion hole 11, and when the first clamping strip 23 and the second clamping strip 24 move to the position of the positioning block 15, the first positioning block 232 and the second positioning block 242 are inserted into the clamping groove 161 at the corresponding ends for pre-clamping.

Between the first contact block 231 and the second contact block 241, between the first groove 234 and the second grooves 244, between the two second oblique sections 25 and between the first anti-off block 233 and the second anti-off block 243 are arranged symmetrically.

A positioning card is inserted into the second insertion hole 12, the positioning card includes an arc-shaped plate 3, a first positioning rod 31 and a second positioning rod 32 protruding horizontally are arranged on the upper end of the arc-shaped plate 3, the extension lines of the protruding ends of the two positioning rods intersect on the horizontal plane; a first positioning boss 311 is provided on the first positioning rod 31, one side of the protruding end of the first positioning rod 31 is provided with a first oblique section 33, and the other side is provided with a first extending section 312 protruding obliquely into the first limiting hole 13, and the first extending section 312 fits with the first inclined wall 17 in the first limiting hole 13, and a first plug 313 is provided on one side of the first oblique section 33; a second positioning boss 321 is provided on the second positioning rod 32, and one side of the protruding end of the second positioning rod 32 is also provided with a first oblique section 33, and the other side is provided with a second extending section 322 protruding obliquely into the second limiting hole 14, and the second extending section 322 is connected with the first inclined wall 17 in the second limiting hole 14, and a second plug 323 is provided on one side of the first oblique section 33.

Between the first positioning boss 311 and the second positioning boss 321, between the two first oblique sections 33, between the first extending section 312 and the second extending section 322, and between the first plug 313 and the first insertion block 323 are arranged symmetrically. The positioning card includes a first positioning rod 31 and a second positioning rod 32, and the first oblique section 33 is provided on each of the two positioning rods.

A notch is provided on the side of the bottom of the cavity structure corresponding to the first insertion hole 11, and a first disassembly groove 41 is formed between the notch and the pushing plate 21, and the first disassembly groove 41 communicates with the weight-reducing hole 272 on the locker; and a second disassembly groove 42 is formed between the side of the bottom of the cavity structure corresponding to the second insertion hole 12 and the arc-shaped plate 3.

Guide grooves are provided at the cavity roof of the cavity structure corresponding to the first positioning boss 311 and the second positioning boss 321, and the first positioning boss 311 and the second positioning boss 321 are respectively clamped in the guide grooves at the corresponding ends, and the groove walls on the side of the two guide grooves corresponding to the direction of the first insertion hole 11 are both second inclined walls 18, and the second inclined wall 18 has the same slope as the first inclined wall 17.

After inserting the male plug, the boss moves from top to bottom and squeezes the first oblique section 33 and the second oblique section 25 sequentially, so that the two clamping strips and the two positioning rods are opened one after another, after the boss moves down to the position, the two positioning rods of the positioning card are retracted and the corresponding positions are attached to the outer wall of the male plug, and the corresponding positions on the two clamping strips are slide along the outer curved surface of the male plug, and move the two clamping strips to the corresponding position of the positioning block 15 for positioning and clamping, at the same time, the boss abuts against the corresponding position of the limiting block 22 to limit the position; when disassembling, first open the two clamping strips and pull out the locker, and then open the two positioning rods to give way to the boss to pull out the male plug.

The using method of the present application is as follows:

As shown in FIGS. 1 to 11, when in use, the locker is inserted into the housing 1 from the position of the first insertion hole 11, and the first clamping strip 23, and when the second clamping strip 24 move to the position of the positioning block 15, the first positioning block 232 and the second positioning block 242 are inserted into the clamping groove 161 at the corresponding end for pre-clamping; At this time, insert the positioning card from the position of the second insertion hole 12, the first extending section 312 extends into the first limiting hole 13, the second extending section 322 extends into the second limiting hole 14, and the first positioning boss 311 and the second positioning boss 321 respectively clamped into the guide groove at the corresponding end, the first oblique sections 33 of the two positioning rods and the limiting block 22 form a hole-like structure for the insertion of the male plug, while the two second oblique sections 25 form a ring-like structure.

Figure 9:
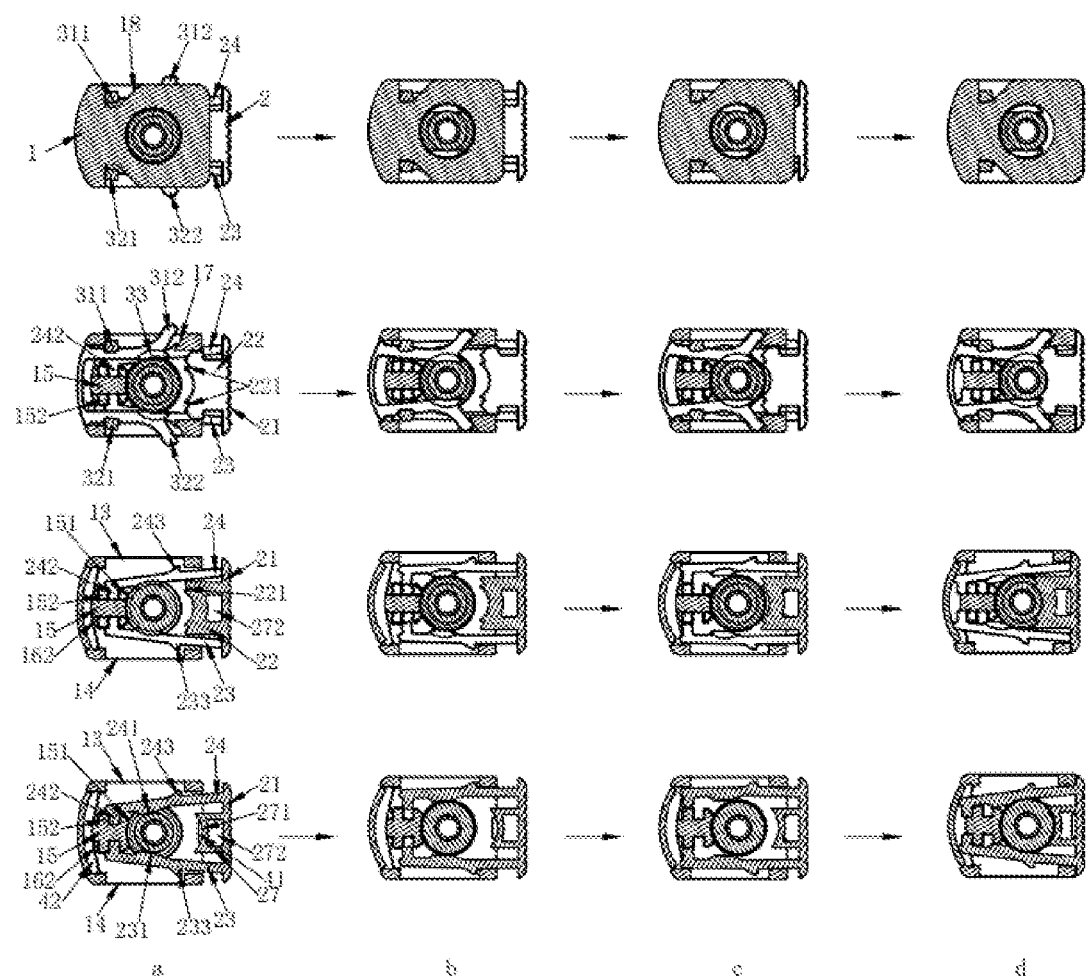
FIG. 9 is a schematic diagram of the installation process of the present application.
Figure 10:
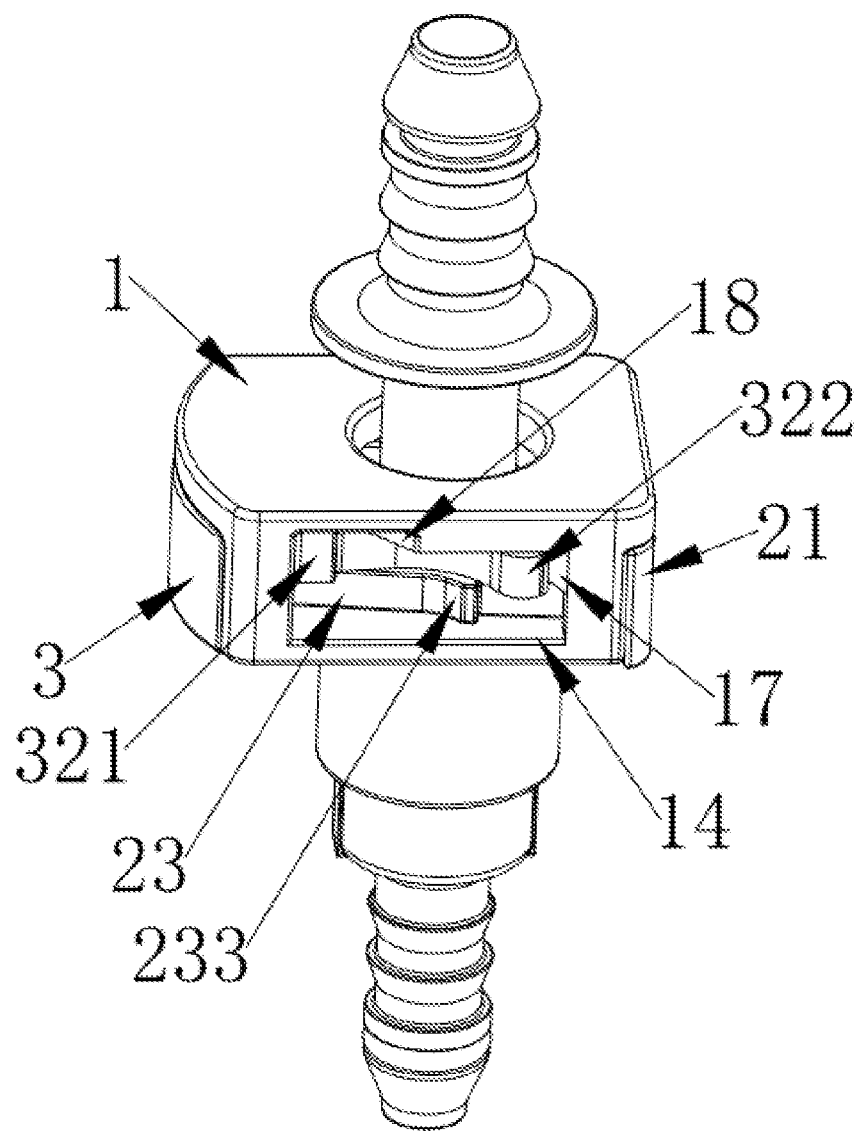
FIG. 10 is a schematic diagram of the installation structure of the present application.
Figure 11:
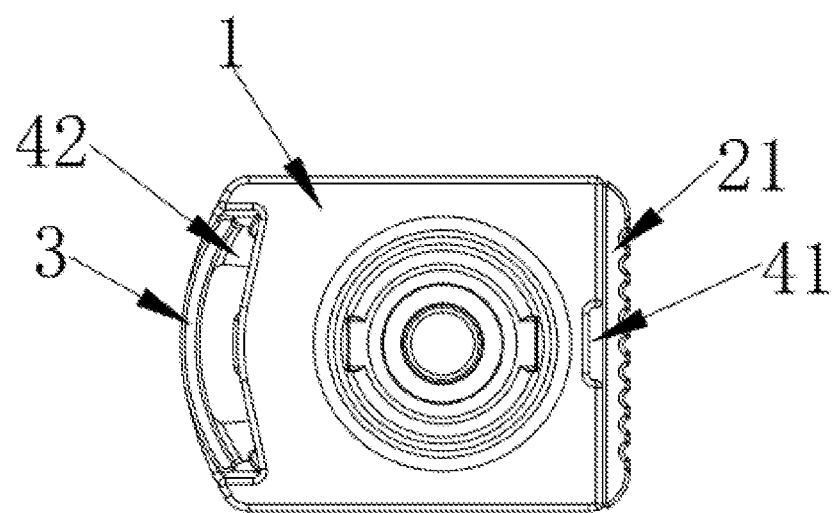
FIG. 11 is a bottom view of FIG. 10.

As shown in diagrams a to d in FIG. 9, after inserting the male plug, the boss moves from top to bottom and squeezes the first oblique section 33, so that the two positioning rods are simultaneously opened. The first extending section 312 and the second extending section 322 move along the first inclined wall 17 at the corresponding end, while the first positioning boss 311 and the second positioning boss 321 move along the second inclined wall 18 in the guide groove. When the boss moved down to the position of the positioning rod, the two positioning rods moved back. Since the two positioning rods are symmetrically tilted, the inner side wall at the position of the first oblique section 33 forms a slope relative to the outer side wall of the male plug. When the two oblique sections 33 move back to fit with the outer wall of the made plug, the inner wall of the oblique section 33 will form a sliding tendency on the outer wall of the male plug, that is, the positioning card will automatically move into the housing 1, and it is also convenient for manual pushing to achieve the purpose of accelerated locking. The inner side walls of the two first oblique sections 33 fit the corresponding positions of the outer side walls of the male plug. At this time, a second disassembly groove 42 is formed between the side of the cavity bottom of the cavity structure of the housing 1 corresponding to the second insertion hole 12 and the arc-shaped plate 3.

Then, the male plug continues to move downward, and the boss squeezes the two second oblique sections 25, and makes the two clamping strips open simultaneously, and both the first positioning block 232 and the second positioning block 242 move out of the clamping groove 161 at the corresponding end. When the boss moves down away from the position of the second oblique section 25, the first clamping strip 23 and the second clamping strip 24 move back. Since the two clamping strips are symmetrically inclined, the inner side wall of the second oblique section 25 forms a slope relative to the outer side wall of the male plug. When the two second oblique sections 25 move back to fit with the outer sidewall of the male plug, the inner sidewall of the second oblique section 25 forms a sliding tendency on the outer sidewall of the male plug, that is, the locking device automatically moves into the housing 1. Since the two positioning blocks have left the clamping groove 161, after the locker moves into the housing 1, the two positioning blocks move and engage with the open groove 162 at the corresponding end for positioning. At this time, the first plug 313 and the second plug 323 are plugged into the relief grooves 221 at the corresponding ends respectively to limit the position, and the step structure formed by the fixing block 27 and the limiting block 22, with a wide top and a narrow bottom, is just above the boss, and also plays the role of anti-off position. The bottom of the cavity structure of the housing 1 is provided with a notch on the side corresponding to the first insertion hole 11, and the notch and the pushing plate 21 form a first disassembly groove 41 (as shown the corresponding positions shown in FIG. 3, FIG. 6, FIG. 11 and in diagram d in FIG. 9).

If the male plug is not installed in place, one case is that when the two positioning rods are in the open state compared with the initial position in the two limiting holes, the positioning card is loose, and the other case is that the boss of the male plug has passed the position of the positioning rod, but the clamping strip and the positioning block have not moved from the pre-clamping position to the clamping positioning position, from the outside of the housing 1, you can see that the two clamping strips of the locker are opened outward, that is, the locker is loose, and the positions of the two limiting holes are convenient for checking the installation status.

When disassembling, use an auxiliary tool to open the two clamping strips from the position of the second disassembly groove 42 and pull out the locker, and move to the position where it is pre-engaged with the positioning block, so as to prevent the locker from slipping (as shown in the diagrams from d to a in FIG. 9), and then, open the two positioning rods at the position of the two limiting holes at the same time, the two positioning rods are in an open shape, the positioning card moves inward for a section, and the two extending sections and the two positioning protrusions on the two positioning rods slide along the first inclined wall 17 and the second inclined wall 18 respectively. The male plug can be pulled out by giving way to the boss, the structure is simple and compact, and the whole disassembly process is simple and fast.

In order to ensure the strength of use and the elastic requirements of disassembly and assembly, the locking device and the positioning card are integrally injection-molded by nylon 66, and this material is the prior art, and will not be repeated here.

It should be noted that, in this embodiment, the slope of the second inclined wall 18 is the same as that of the first inclined wall 17 and does not have uniqueness. According to the use requirements and structural settings, the slope setting of the corresponding position should be convenient for disassembly and assembly.

The parts not described in the present application are consistent with the prior art, and will not be repeated here.

The above are only the implementation manners of the present application, and are not intended to limit the patent scope of the present application. All equivalent structures made using the contents of the description and drawings of the present application, directly or indirectly used in other related technical fields, are also within the scope of patent protection of the present application.

What is claimed is:

1. An error-proof double-locking quick connector, comprising a male plug with a boss and a housing, wherein a cavity structure is provided in the housing, and one end of the cavity structure is provided with a first insertion hole, the other end of the cavity structure is provided with a second insertion hole, and a first limiting hole and a second limiting hole communicating with each other are symmetrically provided at a middle position of the corresponding cavity structure of the housing, an upper part of the same end hole wall of the two limiting holes is provided with a first inclined wall, a positioning block is also provided in the cavity structure, and two first locking blocks and two second locking blocks are symmetrically arranged on the positioning block, corresponding positions of the first locking block, the second locking block and the positioning block at a corresponding end form a clamping groove, corresponding positions of the second locking block and the positioning block form an open groove, a locker is inserted into the first insertion hole, the locker comprises a pushing plate, and an upper end of the pushing plate is provided with a limiting block, and a lower end of the pushing plate is provided with a first clamping strip and a second clamping strip, a second oblique section is provided on each of the two clamping strips, and corresponding positions of the two clamping strips are pre-engaged with the position of the clamping groove; a positioning card is inserted into the second insertion hole, and the positioning card comprises a first positioning rod and a second positioning rod, each of the two positioning rods is provided with a first oblique section; after inserting a male plug, the boss moves from top to bottom and squeezes the first oblique section and the second oblique section sequentially, so that the two clamping strips and the two positioning rods are opened one after another, after the boss moves down to the position, the two positioning rods of the positioning card are retracted and the corresponding positions are attached to an outer wall of the male plug, and corresponding positions on the two clamping strips are slide along an outer curved surface of the male plug, and move the two clamping strips to the position of the open groove for positioning and clamping, at the same time, the boss abuts against a corresponding position of the limiting block to limit the position; when disassembling, first open the two clamping strips and pull out the locker, and then open the two positioning rods to give way to the boss to pull out the male plug.

2. The error-proof double-locking quick connector according to claim 1, wherein an arc groove matching an outer diameter of the male plug is provided on one side of the limiting block, and a relief groove is respectively provided on left and right sides of the notch of the arc groove, and a horizontally protruding protrusion is provided on an outer side of each of the relief grooves, each of the protrusions is provided with a relief oblique section; a fixing block is provided at a lower end of the limiting block, and the fixing block and the limiting block forms a stepped structure with a wide top and a narrow bottom, a limiting groove concentric with the arc groove is provided on the fixing block, and a weight-reducing hole is provided on a lower end surface of the fixing block.

3. The error-proof double-locking quick connector according to claim 1, wherein the first clamping strip and the second clamping strip protruding horizontally are provided on the limiting block, extension lines of the protruding ends of the two clamping strips intersect on the horizontal plane; a first contact block and a first positioning block are sequentially provided on an inner side wall of the first clamping strip along the extending direction, an outer wall of the first clamping strip is provided with a first anti-off block, an inner wall of the first contact block is provided with a first groove, an upper end of the first contact block is provided with a second oblique section; a second contact block and a second positioning block are sequentially provided on an inner side wall of the second clamping strip along the extending direction, and an outer side wall of the second clamping strip is provided with a second anti-off block, an inner side wall of the second contact block is provided with a second groove, and an upper end of the second contact block is also provided with a second oblique section, the locker extends into the first insertion hole, and when the first clamping strip and the second clamping strip move to the position of the positioning block, the first positioning block and the second positioning block are inserted into the clamping groove at corresponding ends for pre-clamping.

4. The error-proof double-locking quick connector according to claim 3, wherein between the first contact block and the second contact block, between the first groove and the second grooves, between the two second oblique sections and between the first anti-off block and the second anti-off block are arranged symmetrically.

5. The error-proof double-locking quick connector according to claim 1, wherein the positioning card comprises an arc-shaped plate, a first positioning rod and a second positioning rod protruding horizontally are arranged on an upper end of the arc-shaped plate, extension lines of the protruding ends of the two positioning rods intersect on the horizontal plane; a first positioning boss is provided on the first positioning rod, one side of the protruding end of the first positioning rod is provided with a first oblique section, and the other side of the protruding end of the first positioning rod is provided with a first extending section protruding obliquely into the first limiting hole, and the first extending section fits with the first inclined wall in the first limiting hole, and a first plug is provided on one side of the first oblique section; a second positioning boss is provided on the second positioning rod, and one side of the protruding end of the second positioning rod is also provided with a first oblique section, and the other side of the protruding end of the second positioning rod is provided with a second extending section protruding obliquely into the second limiting hole, and the second extending section is connected with the first inclined wall in the second limiting hole, and a second plug is provided on one side of the first oblique section.

6. The error-proof double-locking quick connector according to claim 5, wherein between the first positioning boss and the first positioning boss, between the two first oblique sections, between the first extending section and the second extending section, and between the first plug and the first insertion block are arranged symmetrically.

7. The error-proof double-locking quick connector according to claim 5, wherein guide grooves are provided at a cavity roof of the cavity structure corresponding to the first positioning boss and the second positioning boss, and the first positioning boss and the second positioning boss are respectively clamped in the guide grooves at the corresponding ends, and the groove walls on the side of the two guide grooves corresponding to the direction of the first insertion hole are both second inclined walls, and the second inclined wall has the same slope as the first inclined wall.

8. The error-proof double-locking quick connector according to claim 1, wherein tooth grooves are provided on an outer surface of the pushing plate.

9. The error-proof double-locking quick connector according to claim 1, wherein a notch is provided on one side of a bottom of the cavity structure corresponding to the first insertion hole, and a first disassembly groove is formed between the notch and the pushing plate, and the first disassembly groove communicates with the weight-reducing hole on the locker, and a second disassembly groove is formed between the side of the bottom of the cavity structure corresponding to the second insertion hole and the arc-shaped plate.

* * * * *